United States Patent
Brown et al.

[11] Patent Number: 5,904,632
[45] Date of Patent: May 18, 1999

[54] FULL-TIME FOUR-WHEEL DRIVE TRANSMISSION

[75] Inventors: David Brown, Diss Norfolk, United Kingdom; Alan P. Zajac, Clay, N.Y.

[73] Assignee: New Venture Gear, Inc., Troy, Mich.

[21] Appl. No.: 09/018,192

[22] Filed: Feb. 4, 1998

Related U.S. Application Data

[60] Provisional application No. 60/041,285, Mar. 21, 1997.

[51] Int. Cl.[6] ........................... F16H 37/08; F16H 37/02; B60K 17/354; B60K 17/344
[52] U.S. Cl. ........................... 475/206; 475/148; 475/202; 475/219; 180/247; 180/248
[58] Field of Search .................................. 475/206, 198, 475/202, 219; 180/247, 248

[56] References Cited

U.S. PATENT DOCUMENTS

| | | |
|---|---|---|
| 2,262,710 | 11/1941 | Lang . |
| 3,235,021 | 2/1966 | Hill . |
| 3,732,943 | 5/1973 | Panhard . |
| 4,643,045 | 2/1987 | Katayama . |
| 4,671,136 | 6/1987 | Katayama . |
| 4,779,699 | 10/1988 | Hatano . |
| 4,805,720 | 2/1989 | Clenet . |
| 4,817,753 | 4/1989 | Hiketa . |
| 4,831,891 | 5/1989 | Kato et al. . |
| 4,875,698 | 10/1989 | Uchiyama . |
| 5,042,610 | 8/1991 | Shiraishi et al. . |
| 5,046,998 | 9/1991 | Frost . |
| 5,086,867 | 2/1992 | Hirota et al. . |
| 5,123,293 | 6/1992 | Umemoto et al. . |
| 5,143,167 | 9/1992 | Moriyama et al. . |
| 5,188,574 | 2/1993 | Echigo et al. . |
| 5,370,018 | 12/1994 | Kwasniewski . |
| 5,443,426 | 8/1995 | Frost . |
| 5,655,986 | 8/1997 | Wilson et al. ..................... 475/206 X |
| 5,662,543 | 9/1997 | Forsyth . |
| 5,704,866 | 1/1998 | Pritchard et al. . |

FOREIGN PATENT DOCUMENTS

2035930  6/1989  United Kingdom .

Primary Examiner—Rodney H. Bonck
Assistant Examiner—Roger Pang
Attorney, Agent, or Firm—Harness, Dickey & Pierce, P.L.C.

[57] ABSTRACT

A transmission for a four-wheel drive vehicle having a multi-speed geartrain and power transfer mechanism incorporated into a common housing assembly. The multi-speed geartrain includes a input shaft, a mainshaft, and a plurality of constant-mesh gearsets arranged for selectively coupling the mainshaft to the input shaft for driven rotation at various speed ratios. The mainshaft can be selectively coupled to the power transfer mechanism for establishing two alternative power transmission routes. In particular, a synchronized range shift mechanism is provided for establishing a high-range transmission route and a low-range transmission route from the mainshaft to the input of an interaxle differential. The torque delivered to the interaxle differential is split between the front and rear drivelines to establish a full-time four-wheel drive mode. As an option, a lock-out clutch can be provided for permitting the interaxle differential to be locked for establishing a locked four-wheel drive mode. As a further option, a mode clutch can be provided for permitting one of the drivelines to be selectively disconnected from the transmission for establishing a two-wheel drive mode.

28 Claims, 4 Drawing Sheets

| GEAR | RATIO | CLUTCH SLEEVE 140 | CLUTCH SLEEVE 150 | CLUTCH SLEEVE 174 | RANGE SLEEVE 194 |
|---|---|---|---|---|---|
| REV-LOW | -10.513 | A | D | R | N |
| 1ST-LOW | 10.475 | A | D | N | L |
| 2ND-LOW | 7.350 | B | D | N | L |
| 3RD-LOW | 5.241 | A | C | N | L |
| 1ST-HIGH | 3.677 | B | C | N | L |
| 2ND-HIGH | 2.686 | A | D | N | H |
| 3RD-HIGH | 1.885 | B | D | N | H |
| 4TH-HIGH | 1.3438 | A | C | N | H |
| 5TH-HIGH | 0.9429 | B | C | N | H |
| REV-HIGH | -4.083 | B | D | R | N |

FULL-TIME FOUR-WHEEL DRIVE TRANSMISSION

This application claims the benefit of U.S. Provisional Application No. 60/041,285, filed Mar. 21, 1997.

BACKGROUND OF THE INVENTION

The present invention relates generally to transmissions for use in four-wheel drive vehicles. More particularly, the present invention is directed to a transmission having a multi-speed geartrain and a power transfer mechanism contained in a single unit.

As is known, the majority of four-wheel drive vehicles are equipped with a transfer case mounted to a multi-speed transmission for directing power from the engine to all four wheels. To accommodate different road surfaces and conditions, many transfer cases are equipped with a mode shift mechanism which permits the vehicle operator to selectively uncouple one set of wheels for establishing a two-wheel drive mode in addition to the four-wheel drive mode. In addition, some transfer cases are also equipped with a gear reduction unit for providing high-range and low-range four-wheel drive modes. Finally, some transfer cases are equipped with an interaxle differential for permitting torque proportioning and speed differentiation between the front and rear drivelines of the four-wheel drive vehicle.

In an effort to minimize the overall size of the drivetrain used in four-wheel drive vehicles, it has been proposed to utilize a transmission of a transaxle-type normally used to drive the front wheels of a front wheel drive vehicle as a four-wheel drive geartrain. In particular, British Patent No. 2,035,930 to Jones et al. teaches of rotating the front wheel drivetrain (i.e., engine and transaxle) 90° such that the transaxle outputs can be interconnected to the front and rear drivelines of the motor vehicle. While such an arrangement may provide an economical drivetrain layout for a full-time four-wheel drive vehicle, the practical applications for such an arrangement are severely limited. In particular, such an arrangement does not permit the vehicle operator to selectively shift "on-the-fly" between high and low four-wheel drive modes, nor can one of the outputs be selectively disconnected from its driveline for establishing a two-wheel drive mode.

Accordingly, the need exists for a transmission which can be used in most conventional four-wheel drive applications and which permits the vehicle operator to selectively shift between the available drive modes and speed ranges.

SUMMARY OF THE INVENTION

It is therefore an object of the present invention to provide a transmission for use with four-wheel drive vehicles having a multi-speed geartrain and a power transfer mechanism integrated into a single unit.

It is another object of the present invention to provide the transmission with a power transfer mechanism having an interaxle differential for establishing a differentiated or "full-time" four-wheel drive mode.

As a related object, the power transfer mechanism can further include a lock-out clutch which can be selectively actuated for locking the interaxle differential to establish a non-differentiated or "locked" four-wheel drive mode.

Another object of the present invention is to provide the transmission with a power transfer mechanism having a synchronized mode clutch for permitting "on-the-fly" shifting between a four-wheel drive mode and a two-wheel drive mode.

Accordingly, the transmission of the present invention includes a multi-speed geartrain including a input shaft, a mainshaft, and a plurality of constant-mesh gearsets which can be selectively engaged to couple the mainshaft to the input shaft for driven rotation at various speed ratios. The mainshaft can be selectively coupled to a power transfer mechanism for establishing two alternative power transmission routes. In particular, the power transfer mechanism includes a synchronized range shift mechanism which is operable for establishing a high-range transmission route and a low-range transmission route from the mainshaft to the input of an interaxle differential. The torque delivered to the interaxle differential is split between the front and rear drivelines to establish a differentiated or "full-time" four-wheel drive mode. As an option, a lock-out clutch can be provided for permitting the interaxle differential to be locked for establishing a non-differentiated or "Locked" four-wheel drive mode. As a further option, a mode clutch can be provided for permitting one of the drivelines to be selectively disconnected from the transmission for establishing a two-wheel drive mode.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENTS

The present invention relates generally to a transmission for use in four-wheel drive vehicles having a multi-speed geartrain and a power transfer mechanism integrated into a common housing assembly. As such, the transmission of the present invention is operable for transferring power from a longitudinally-aligned engine to the front and rear drivelines of a four-wheel drive vehicle.

Figure 1:
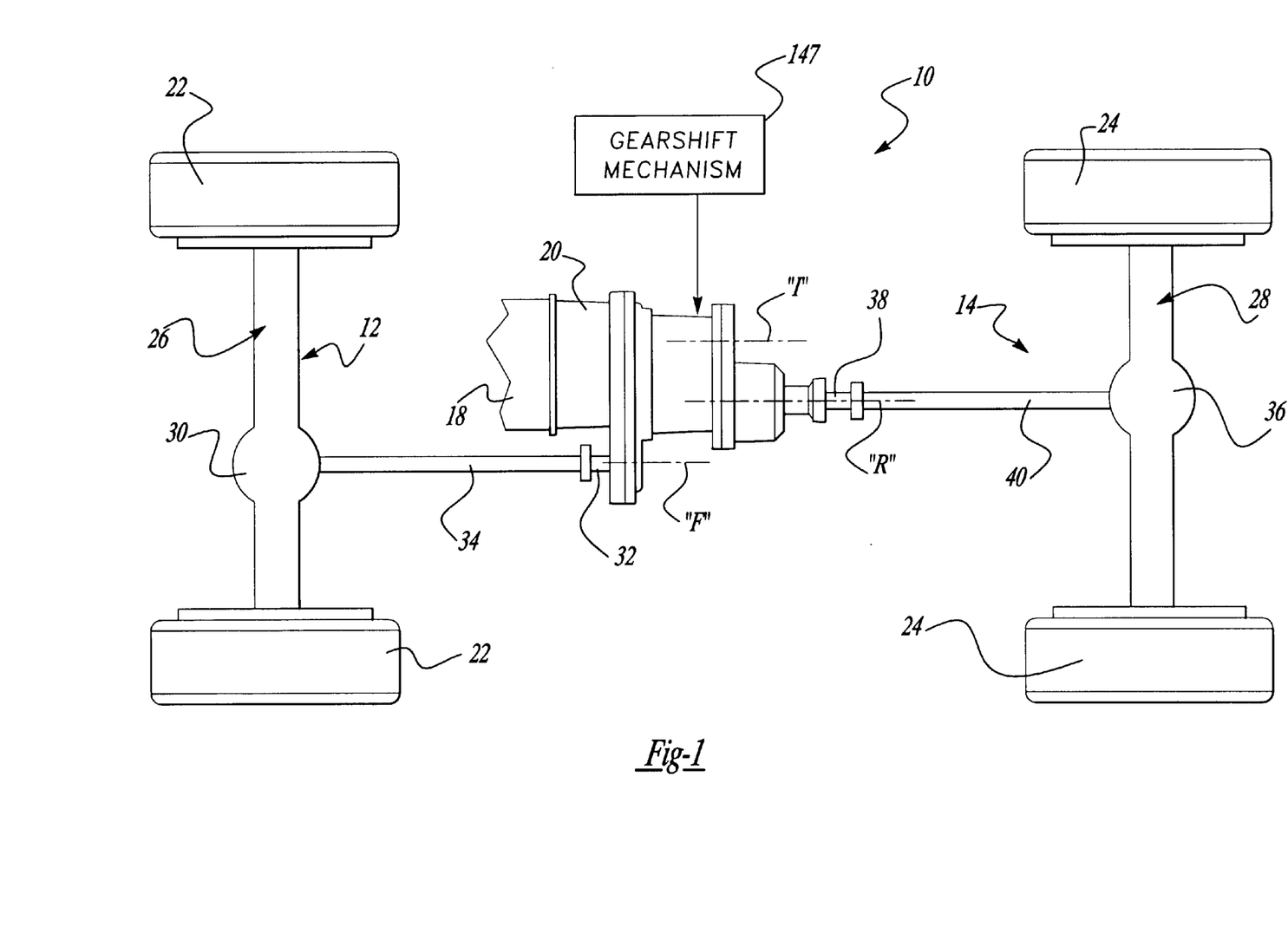
FIG. 1 is a schematic view of a four-wheel drive motor vehicle equipped with a transmission according to the present invention.

Referring to FIG. 1, a motor vehicle 10 is schematically shown. Vehicle 10 has a front driveline 12 and a rear driveline 14 drivable from a source of power, such as an engine 18, through a transmission 20. Engine 18 is mounted in an in-line or longitudinal orientation along the long axis of vehicle 10 and its output is coupled to the input of transmission 20. Front and rear sets of wheels 22 and 24 are part of front and rear drivelines 12 and 14, respectively, and are connected at opposite ends of front and rear axle assemblies 26 and 28, respectively. Front axle assembly 26 includes a front differential 30 that is coupled to a front output 32 of transmission 20 via a front prop shaft 34. Likewise, rear axle assembly 28 includes a rear differential 36 that is coupled to a rear output 38 of transmission 20 via a rear prop shaft 40. As is conventional, one or more universal joints (not shown) may be installed on opposite ends of prop shafts 34 and 40, as required. As will be detailed, an inherent feature of transmission 20 is that its outputs 32 and 38 can be offset relative to each other as well as to the transmission input to provide improved underbody packaging. Specifically, the input to transmission 20 is rotatable about a first ("I") axis while front and rear outputs 32 and 38 are respectively shown to be rotatable about a second axis ("F") and a third axis ("R").

Figure 2:
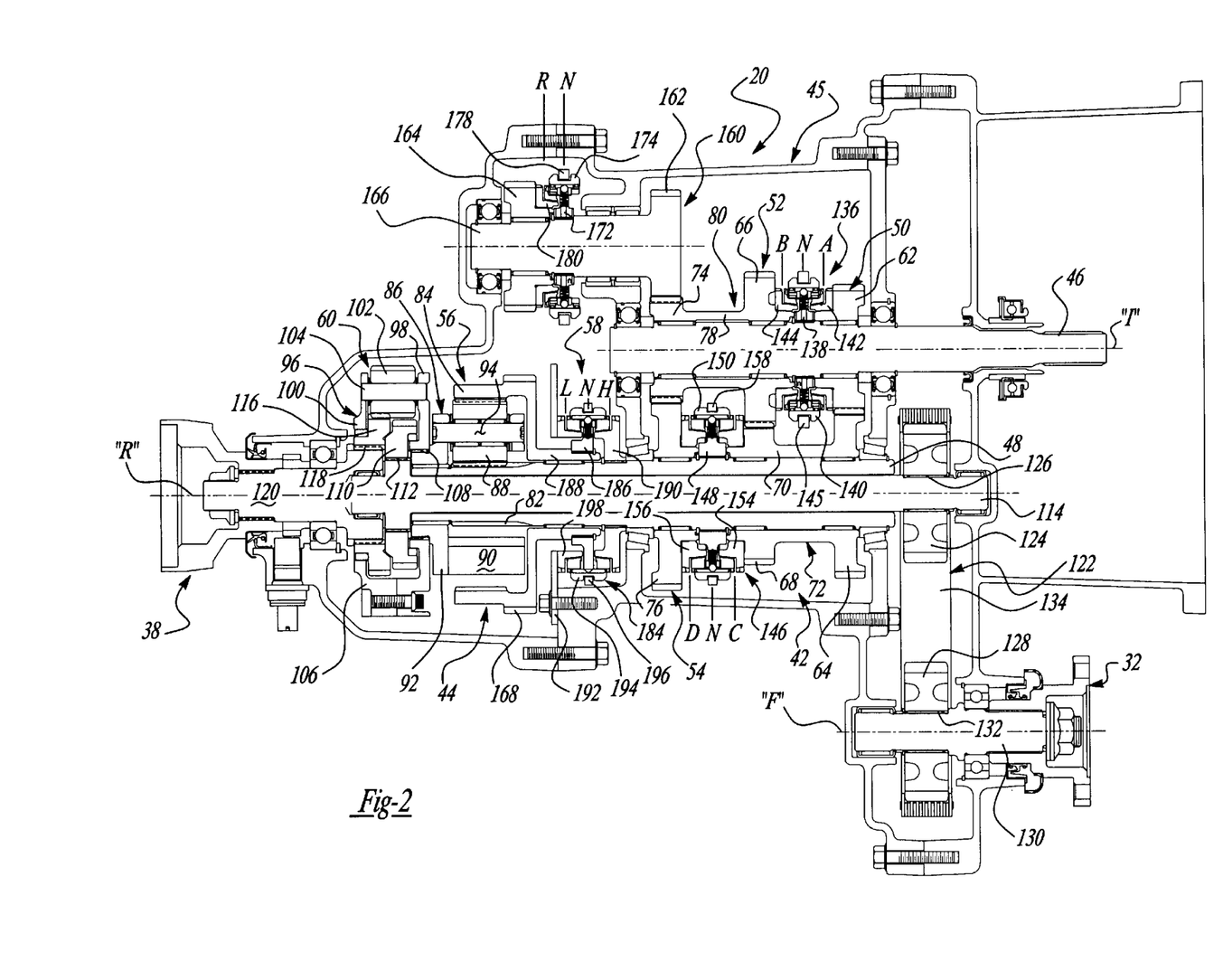
FIG. 2 is a sectional view of the transmission constructed according to the present invention.

With particular reference to FIG. 2, transmission 20 is shown to include two primary sections, namely, a multi-speed geartrain 42 and a power transfer mechanism 44, both of which are located with a housing assembly 45. Geartrain 42 includes an input shaft 46 driven by the output of engine 18 through engagement of a conventional manually-operable clutch (not shown), a mainshaft 48, and a series of constant-mesh gearsets 50, 52 and 54. As will be detailed, each gearset can be selectively engaged to couple mainshaft 48 for rotation with input shaft 46 for a predetermined gear or speed ratio. Thus, rotary power (i.e., drive torque) from engine 18 is selectively delivered from input shaft 46 to mainshaft 48 through the gearsets. Power is thereafter delivered from mainshaft 48 to front and rear outputs 32 and 38 via power transfer mechanism 44. In general, power transfer mechanism 44 of transmission 20 includes a planetary gearset 56, a synchronized range shift mechanism 58, and an interaxle differential 60 interconnecting the output of planetary gearset 56 to front output 32 and rear output 38. Interaxle differential 60 permits speed differentiation between front output 32 and rear output 38 while delivering drive torque thereto at a predetermined torque split or ratio. Accordingly, a differentiated or "full-time" four-wheel drive mode is established by transmission 20. While interaxle differential 60 is specifically shown as a dual-planetary gearset, it will be appreciated that any suitable equivalent differential device (i.e., single planetary or beveled gearset) known in the transmission art can be used in substitution therefor.

With continued reference to FIG. 2, first gearset 50 is shown to include a first input gear 62 rotatably supported on input shaft 46 and which is in constant mesh with a first drive gear 64 rotatably supported on mainshaft 48. Second gearset 52 includes a second input gear 66 rotatably supported on input shaft 46 and which is in constant mesh with a second drive gear 68 rotatably supported on mainshaft 48. First drive gear 64 and second drive gear 68 are shown integrally formed on a stubshaft 70 to define a first compound gear 72. Third gearset 54 is shown to include a third input gear 74 rotatably supported on input shaft 46 and which is in constant mesh with a third drive gear 76 rotatably supported on mainshaft 48. Second input gear 66 and third input gear 74 are integrally formed on a stubshaft 78 for defining a second compound gear 80.

Planetary gearset 56 includes a sun gear 82 formed integrally on an end portion of mainshaft 48, a ring gear 84, and a carrier assembly 86 having a plurality of pinion gears 88 rotatably supported therefrom which are meshed with sun gear 82 and ring gear 84. In particular, carrier assembly 86 includes a front carrier plate 90 and a rear carrier plate 92 which are suitably interconnected, with pinion shafts 94 extending therebetween on which pinion gears 88 are rotatably supported.

In general, interaxle differential 60 has an input driven by carrier assembly 86 of planetary gearset 56, a first output connected to front output 32, and a second output connected to rear output 38. More specifically, interaxle differential 60 includes a planet carrier 96 having a front carrier ring 98 interconnected to a rear carrier ring 100, a set of first pinions 102 rotatably supported on pinion shafts 104 between carrier rings 98 and 100, and a set of second pinions 106 (shown in phantom) likewise rotatably supported on pinion shafts (not shown) extending between carrier rings 98 and 100. Planet carrier 96 is driven by the output of planetary gearset 56 in that carrier ring 98 is fixed via a splined connection 108 to rear carrier plate 92 of carrier assembly 86. As seen, the first output of differential 60 is a first sun gear 110 fixed via a splined connection 112 to one end of a transfer shaft 114 which concentrically extends through hollow mainshaft 48 for rotation relative thereto about the third axis. The second output of differential 60 is a second sun gear 116 fixed via a splined connection 118 to a rear output shaft 120. Rear output shaft 120 is adapted to be interconnected to rear propshaft 40 in a conventional manner. Each first pinion 102 is in constant mesh with second sun gear 116 and with a corresponding one of second pinions 106. Second pinions 106 are also in constant mesh with first sun gear 110. Thus, interaxle differential 60 transfers drive torque from planet carrier 96 to transfer shaft 114 via first sun gear 110 and to rear output shaft 120 via second sun gear 116. This arrangement permits speed differentiation between rear output shaft 20 and transfer shaft 114 while providing a predetermined torque split therebetween.

As is traditional, the torque distribution ratio across interaxle differential 60 is based on the gear geometry for each of the meshed gear components associated therewith. To provide means for transferring drive torque from transfer shaft 114 to front output 32, a drive mechanism 122 is provided. Drive mechanism 122 includes a drive sprocket 124 fixed via a splined connection 126 to transfer shaft 114, a driven sprocket 128 fixed to a front output shaft 130 via a splined connection 132, and a continuous drive chain 134 meshed with both drive sprocket 124 and driven sprocket 128. Front output shaft 130 is adapted to be connected to front propshaft 34 in a conventional manner.

As noted, geartrain 42 is arranged to deliver drive torque at various speed ratios from input shaft 46 to mainshaft 48. As such, geartrain 42 includes a first synchronizer clutch assembly 136 operably installed between first input gear 62 and second input gear 66 on input shaft 46. First synchronizer clutch assembly 136 includes a hub 138 fixed (i.e., splined) for rotation with input shaft 46 and a clutch sleeve 140 supported for rotation with and bidirectional axial movement on hub 138. First synchronizer clutch assembly 136 is shown as a single-cone type arrangement with it understood that any suitable synchronizer clutch used for effecting synchronous gear changes between input shaft 46 and mainshaft 48 may be used. When clutch sleeve 140 is moved from the central non-actuated or neutral (N) position shown to the position denoted by construction line "A", it couples first input gear 62 to input shaft 46. In particular, upon synchronization between input shaft 46 and first input gear 62, the spline teeth of clutch sleeve 140 move into meshed engagement with clutch teeth on a clutch ring 142 fixed to first input gear 62. Conversely, when clutch sleeve 140 is moved from the neutral (N) position to the position denoted by construction line "B", it couples second input gear 66 to input shaft 46. Such movement of clutch sleeve 140 from its neutral (N) position to its (B) position causes speed synchronization between second compound gear 80 and input shaft 46 and thereafter permits the spline teeth of clutch sleeve 140 to move into engagement with clutch teeth formed on a clutch ring 144 fixed to second input gear 66. Clutch sleeve 140 is axially moveable relative to hub 138 in a well known manner in response to axial movement of a first shift fork, partially shown at reference numeral 145, which is attached to a suitable gearshift mechanism, schematically shown in FIG. 1 by block 147.

A second synchronizer clutch assembly 146, also shown as a single-cone arrangement, is operably installed on mainshaft 48 between second drive gear 68 and third drive gear 76. Synchronizer clutch assembly 146 includes a hub 148 fixed (i.e., splined) for rotation with mainshaft 48 and a clutch sleeve 150 that is supported for rotation with a bidirectional axial movement on hub 148. When clutch sleeve 150 is moved from the central non-actuated or neutral (N) position shown to the position denoted by construction line "C", it couples second drive gear 68 to mainshaft 48, thereby coupling first compound gear 72 to mainshaft 48. In particular, upon synchronization between mainshaft 48 and third drive gear 68, the splines of clutch sleeve 150 are adapted to move into engagement with the clutch teeth formed on a clutch ring 154 fixed to second drive gear 68. Conversely, when clutch sleeve 150 is moved from the neutral (N) position to the position denoted by construction line "D", it couples third drive gear 76 to mainshaft 48. Again, following synchronization between third drive gear 76 and mainshaft 48, the spline teeth of clutch sleeve 150 moves into meshed engagement with clutch teeth formed on a clutch ring 156 fixed to third drive gear 76. Clutch sleeve 150 is axially movable between its "C" and "D" positions by means of a second shift fork, partially shown at 158, that is also coupled to gearshift mechanism 147.

Geartrain 42 also includes a synchronized reverse gear assembly 160 having a reverse input gear 162 in constant mesh with third input gear 74 and a reverse output gear 164 which is rotatably supported on a stubshaft 166. As seen, reverse input gear 162 is integrally formed on stubshaft 166. Reverse output gear 164 is in constant mesh with a reverse transfer gear 168 integrally formed on ring gear 84 of planetary gearset 56. This constant meshed engagement is shown schematically by phantom lines in FIG. 2. Additionally, geartrain 42 includes a third synchronizer clutch assembly 170, also of the single-cone type, which includes a hub 172 fixed (i.e., splined) to stubshaft 166 and a clutch sleeve 174 supported for rotation with and axial sliding movement on hub 172. Clutch sleeve 174 is movable between the non-actuated or neutral (N) position shown to a position denoted by construction line "R" for coupling reverse output gear 164 to stubshaft 166, thereby transferring torque delivered to second compound gear 80 to ring gear 84 of planetary gearset 56 to establish a pair of reverse speed ratios as will be described. Specifically, splines on clutch sleeve 174 can move into engagement with clutch teeth formed on a clutch ring 180 fixed to reverse output gear 164 following speed synchronization between reverse output gear 164 and reverse input gear 162. A third shift fork, partially shown at 178, is also interconnected to gearshift mechanism 147.

To provide means for delivering drive torque from mainshaft 48 to the input of interaxle differential 60, synchronized range shift mechanism 58 is provided in associated with planetary gearset 56. As best seen from FIG. 2, synchronized range shift mechanism 58 includes a fourth synchronizer clutch assembly 184 having a hub 186 fixed (i.e., splined) to an axial hub segment 188 of ring gear 84 which is rotatably supported on mainshaft 48. Synchronizer clutch assembly 184 further includes a drive hub 190 fixed (i.e., splined) to mainshaft 48 and a brake plate 192 fixed (i.e., bolted) to housing 45. A range sleeve 194 is supported for rotation with and bi-directional axial movement on hub 186 from the central non-actuated neutral (N) position shown to one of a high-range (H) position and a low-range (L) position via movement of a fourth shift fork 196, likewise connected to gearshift mechanism 147. Axial movement of range sleeve 194 from its neutral position (N) to its high-range position (H) results in speed synchronization between mainshaft 48 and ring gear 84. Following such speed synchronization, splines on range sleeve 194 can move into meshed engagement with clutch teeth formed on drive hub 190 for coupling ring gear 84 for direct rotation with mainshaft 48. Since sun gear 82 is also driven directly by mainshaft 48, such locking of ring gear 84 to mainshaft 48 results in carrier assembly 86 being rotatably driven at a direct speed ratio relative to mainshaft 48. Thus, with range sleeve 194 in its high-range (H) position, carrier assembly 86 is driven by mainshaft 48 for supplying drive torque to planet carrier 96 of interaxle differential 60 via a high-range power transmission route. Conversely, axial movement of range sleeve 194 from its neutral (N) position toward its low-range (L) position results in speed synchronization between ring gear 84 and housing 45, whereby ring gear 84 is braked against rotary motion. Following braking of ring gear 84, the splines of range sleeve 194 can move into meshed engagement with clutch teeth formed on a clutch ring 198 fixed to brake plate 192. With ring gear 84 held against rotation, carrier assembly 86 is driven at a reduced speed ratio relative to mainshaft 48 for establishing a low-range power transmission route between mainshaft 48 and planet carrier 96 of interaxle differential 60.

Figure 3:
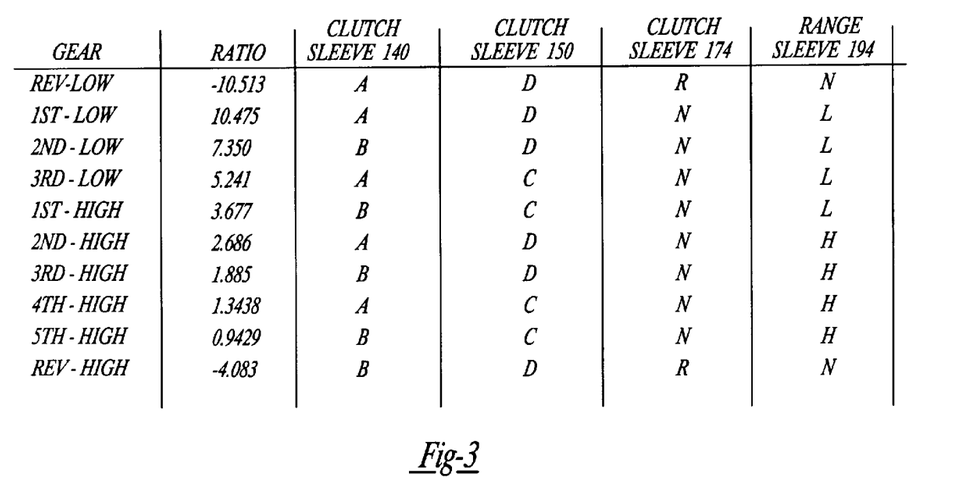
FIG. 3 is a chart listing the speed ratios that are available with the transmission of the present invention.

Referring now to FIG. 3, a chart is shown which identifies the positions of shift sleeves 140, 150, 174 and 194 for establishing at least eight forward speed ratios and a pair of reverse speed ratios. Preferably, the available speed ratios are segregated into a first or "High" set of gears and a second or "Low" set of gears. The High set of gears includes five forward speed ratios and a reverse speed ratio which are well-suited for normal on-road driving conditions. In contrast, the Low set of gears includes three forward speed ratios and a reverse speed ratio that are well-suited for off-road driving needs. Additionally, representative speed ratio values are listed to illustrate the sequential arrangement provided by transmission 20. To this end, the following Table lists the number of teeth associated with the gear components of transmission 20 for establishing the speed ratios. However, those skilled in the art will understand that different gear tooth combinations can be used to modify the ratio values generated by transmission 20 to meet differing vehicular requirements. Finally, as a means of reducing the inertial loading during gear shifting, it can be seen that clutch sleeve 140 moves through its neutral position which shifting between each forward speed ratio.

TABLE

| Gear Component | No. Of Teeth |
|---|---|
| first input gear 62 | 32 |
| first drive gear 64 | 43 |
| second input gear 66 | 35 |
| second drive gear 68 | 33 |
| third input gear 74 | 26 |
| third drive gear 76 | 49 |
| sun gear 82 | 30 |
| ring gear 84 | 87 |
| pinion gears 88 | 28 |
| reverse input gear 162 | 28 |
| reverse output gear 164 | 48 |
| reverse transfer gear 168 | 87 |

Figure 4:
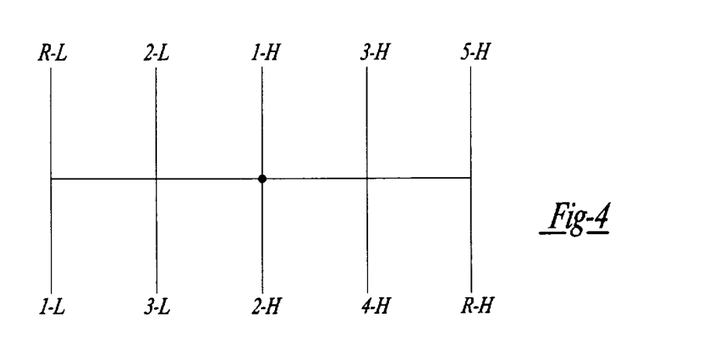
FIG. 4 is an exemplary shift gate pattern for the gearshift mechanism associated with the transmission of the present invention.

Gearshift mechanism 147 is intended to encompass any suitable manually-operated or electrically-actuated device or system capable of controlling coordinated movement of the clutch sleeves and the range sleeve for establishing the desired speed ratio. For example, gearshift mechanism 147 can include a single shift lever movable through the shift gate pattern shown in FIG. 4 to establish any of the ten available gears. In the alternative, gearshift mechanism 147 can utilize separate shift levers for controlling each of the High and Low sets of gears.

Figure 5:
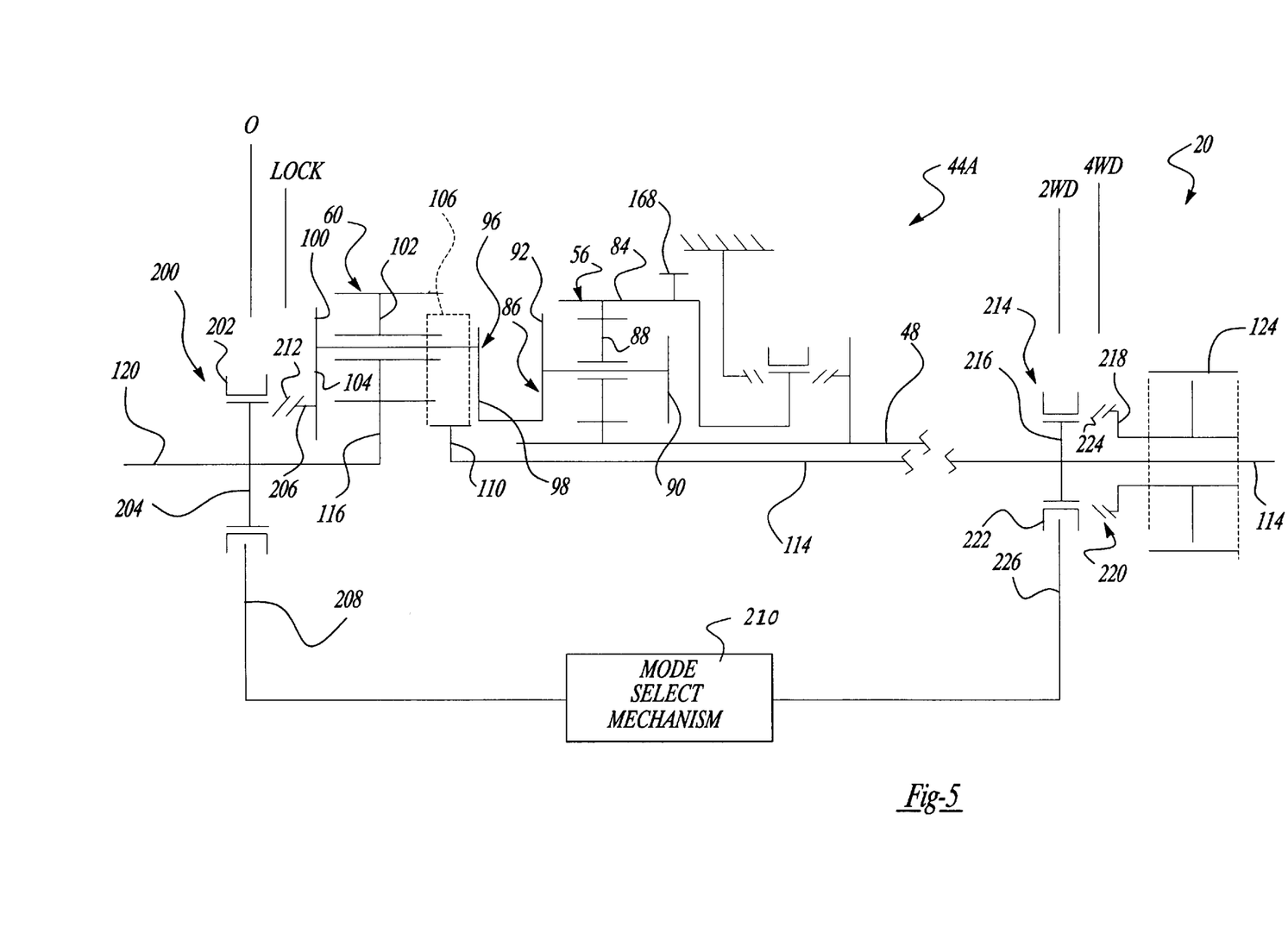
FIG. 5 is a schematic illustration of a modified version of the transmission equipped with a lock-out clutch and a mode clutch.

Referring now to FIG. 5, a schematic representation of a modified power transfer mechanism 44A for transmission 20 is shown to include a lock-out clutch 200 in association with interaxle differential 60. In general, lock-out clutch 200 is operable in a Locked mode for preventing speed differentiation across interaxle differential 60 and in an Open mode to permit such differentiation. More specifically, lock-out clutch 200 includes a lock-out collar 202 having internal spline teeth mounted for rotation with and axial sliding movement on the external spline teeth of a hub 204 which, in turn, is fixed to rear output shaft 120. Lock-out collar 202 is shown in a first position, denoted by reference line "O", whereat its spline teeth are released from engagement with clutch teeth of a clutch ring 206 fixed to rear carrier ring 100 of planet carrier 96. In this first position of lock-out collar 202, lock-out clutch 200 is operating in its Open mode and speed differentiation is permitted between rear output shaft 120 and transfer shaft 114. Lock-out collar 202 can be slid axially to a second position, denoted by reference line "Lock", whereat its spline teeth are meshed with clutch teeth on clutch ring 206. In this second position of lock-out collar 202, lock-out clutch 200 is operating in its Locked mode such that speed differentiation between rear output shaft 120 and transfer shaft 114 is prevented. Movement of lock-out collar 202 between its first and second positions is effectuated by a shift fork 208 which is connected to a suitable mode select mechanism, shown by block 210. Mode select mechanism 210 can be any manually-operated or power-operated shift system capable of moving lock-out collar 202 to the position corresponding to the selected differential mode. As an option, lock-out clutch 200 may include a synchronizer 212 for causing speed synchronization in response to movement of collar 202 toward its Lock position.

As an additional optional feature, power transfer mechanism 44A of transmission 20 is shown to include a mode clutch 214 which can be selectively actuated for shifting transmission 20 "on-the-fly" between a four-wheel drive mode and a two-wheel drive mode. To this end, mode clutch 214 provides a means for selectively coupling and uncoupling transfer shaft 114 (or front output shaft 130) with front prop shaft 34. In particular, mode clutch 214 includes a hub 216 fixed for rotation with transfer shaft 114, a clutch ring 218 fixed for rotation with drive sprocket 124, and a synchronizer clutch assembly 220 therebetween. In an embodiment incorporating mode clutch 214 into power transfer mechanism 44A, drive sprocket 124 is rotatably supported on transfer shaft 114. Synchronizer clutch assembly 220 includes a mode collar 222 having internal spline teeth which are retained for rotation with and axial sliding movement on external spline teeth formed on hub 216. A synchronizer 224 is disposed between mode collar 222 and clutch ring 218 in a well known manner such that movement of mode collar 222 from its 2 WD position shown toward its 4 WD position causes speed synchronization to occur between front output shaft 130 and transfer shaft 114. Once synchronization is complete, the spline teeth on mode collar 222 meshingly engage the clutch teeth on clutch ring 218, thereby directly coupling drive sprocket 124 to transfer shaft 114. Movement of mode collar 222 between its 2 WD and 4 WD positions is effectuated by a mode fork, partially shown at 226, which is likewise connected to mode select mechanism 210. When operation of transmission 20 in a full-time four-wheel drive mode is desired, the vehicle operator actuates mode select mechanism 210 for locating lock-out collar 202 in its first position and mode collar 222 in its 4 WD position. When a locked four-wheel drive mode is selected, lock-out collar 202 is located in its second position and mode collar 222 is located in its 4 WD position. Finally, when operation of transmission 20 in the two-wheel drive mode is desired, lock-out clutch 200 is located in its second position and mode collar 222 is located in its 2 WD position.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A transmission for use in a motor vehicle having an engine and front and rear drivelines, said transmission comprising:

a housing;

a first shaft supported for rotation in said housing and adapted to be driven by the engine;

a second shaft supported for rotation in said housing;

a plurality of constant mesh gearsets for selectively coupling said second shaft to said first shaft for driven rotation and various speed ratios;

an interaxle differential having an input member, a first output member adapted to be interconnected to the front driveline, and a second output member adapted to be interconnected to the rear driveline;

a planetary gearset having a first gear fixed for rotation with said second shaft, a second gear, and a third gear meshed with said first gear and said second gear, said third gear is rotatably supported on a carrier which is coupled to said input member of said interaxle differential; and a clutch for selectively coupling said second gear to said second shaft for driving said input member at a first speed ratio relative to said second shaft, and said clutch is further operable for selectively coupling said second gear to said housing for driving said input member at a second speed ratio relative to said second shaft.

2. The transmission of claim 1 wherein said first gear is a sun gear, said second gear is a ring gear, and said third gear is a pinion gear.

3. The transmission of claim 1 wherein said clutch includes a range sleeve mounted for rotation with said second gear and movement between a first position whereat said second gear is coupled to said second shaft and a second position whereat said second gear is coupled to said housing, a first synchronizer for causing speed synchronization between said second gear and said second shaft in response to movement of said range sleeve to said first position, and a second synchronizer for causing speed synchronization between said second gear and said housing in response to movement of said range sleeve to said second position.

4. The transmission of claim 1 further comprising a reverse gear assembly including a reverse input gear driven by one of said constant mesh gear sets, a reverse output gear meshed with a transfer gear fixed to said second gear, and a second clutch for selectively coupling said reverse output gear to said reverse input gear.

5. The transmission of claim 1 further comprising:
   a rear output shaft coupling said second output member of said interaxle differential to the rear driveline;
   a transfer shaft coupled to said first output member of said interaxle differential;
   a front output shaft coupled to the front driveline; and
   a drive mechanism coupling said transfer shaft to said front output shaft.

6. The transmission of claim 5 further comprising a second clutch for selectively coupling said transfer shaft to said drive mechanism.

7. The transmission of claim 1 wherein said plurality of constant mesh gearsets include a first input gear rotatably supported on said first shaft, a first compound gear rotatably supported on said second shaft and having first and second drive gears with said first drive gear meshed with said first input gear, a second compound gear rotatably supported on said first shaft and having second and third input gears with said second input gear meshed with said second drive gear, a third drive gear rotatably supported on said second shaft and meshed with said third input gear, a second clutch for selectively coupling one of said first and second input gears to said first shaft, and a third clutch for selectively coupling one of said second and third drive gears to said second shaft.

8. The transmission of claim 7 further comprising a reverse input gear meshed with said third input gear, a reverse output gear meshed with a transfer gear fixed to said second gear, and a fourth clutch for selectively coupling said reverse output gear to said reverse input gear.

9. The transmission of claim 7 wherein said second clutch includes a lock-out collar movable between a first position directly coupling said input member to one of said output members for shifting said interaxle differential into a locked mode and a second position uncoupling said input member from said one output member.

10. The transmission of claim 1 further comprising a second clutch for selectively coupling any two of said input member and said first and second output members of said interaxle differential to prevent speed differentiation between said first and second output members.

11. The transmission of claim 1 further comprising a second clutch operable for selectively disconnecting one of said first and second output members from driven connection with its corresponding driveline.

12. The transmission of claim 11 wherein said second clutch includes a mode collar movable between a 4 WD position whereat said one of said first and second output members is coupled to its corresponding driveline for establishing a four-wheel drive mode, and a 2 WD position whereat said one of said first and second output members is uncoupled from its corresponding driveline for establishing a two-wheel drive mode.

13. The transmission of claim 12 wherein said second clutch further includes a synchronizer for causing speed synchronization between said one of said first and second output members and its corresponding driveline in response to movement of said mode collar to said 4 WD position.

14. A transmission for use in a motor vehicle having an engine and front and rear drivelines, said transmission comprising:
   a housing;
   a first shaft supported for rotation in said housing and adapted to be driven by the engine;
   a second shaft supported for rotation in said housing;
   a plurality of constant mesh gearsets for selectively coupling said second shaft to said first shaft for driven rotation and various speed ratios;
   an interaxle differential having an input member, a first output member adapted to be interconnected to the front driveline, and a second output member adapted to be interconnected to the rear driveline;
   a planetary gearset having a sun gear fixed for rotation with said second shaft, a ring gear, and a pinion gear meshed with said sun gear and said ring gear, said pinion gear rotatably supported on a carrier which is coupled to said input member of said interaxle differential;
   a first clutch for selectively coupling said ring gear to one of said second shaft and said housing; and
   a second clutch operable in a first mode to permit speed differentiation between said first and second output members and in a second mode to prevent speed differentiation between said first and second output members.

15. The transmission of claim 14 wherein said first clutch includes a range sleeve mounted for rotation with said ring gear and movement between a first position whereat said ring gear is coupled to said second shaft and a second position whereat said ring gear is coupled to said housing.

16. The transmission of claim 14 further comprising a reverse gear assembly including a reverse input gear driven by one of said constant mesh gear sets, a reverse output gear meshed with a transfer gear fixed to said ring gear, and a second clutch for selectively coupling said reverse output gear to said reverse input gear.

17. The transmission of claim 14 further comprising:
   a rear output shaft coupling said second output member of said interaxle differential to the rear driveline;
   a transfer shaft coupled to said first output member of said interaxle differential;
   a front output shaft coupled to the front driveline; and
   a drive mechanism coupling said transfer shaft to said front output shaft.

18. The transmission of claim 17 further comprising a third clutch for selectively coupling said transfer shaft to said drive mechanism.

19. The transmission of claim 14 wherein said second clutch includes a lock-out collar movable between a first position directly coupling said input member to one of said output members for shifting said interaxle differential into a locked mode and a second position uncoupling said input member from said one output member.

20. The transmission of claim 14 further comprising a third clutch operable for selectively disconnecting one of said first and second output members from driven connection with its corresponding driveline.

21. The transmission of claim 20 wherein said third clutch includes a mode collar movable between a 4 WD position whereat said one of said first and second output members is coupled to its corresponding driveline for establishing a four-wheel drive mode, and a 2 WD position whereat said one of said first and second output members is uncoupled from its corresponding driveline for establishing a two-wheel drive mode.

22. A transmission for use in a motor vehicle having an engine and front and rear drivelines, said transmission comprising:
   a housing;

an input shaft supported for rotation in said housing and adapted to be driven by the engine;

a mainshaft supported for rotation in said housing;

a plurality of constant mesh gearsets for selectively coupling said mainshaft to said input shaft for driven rotation and various speed ratios;

an interaxle differential having an input member, a first output member, and a second output member;

a front output shaft interconnecting said first output to the front driveline;

a rear output shaft interconnecting said second output member to the rear driveline;

a planetary gearset having a first gear fixed for rotation with said mainshaft, a second gear, and a third gear meshed with said first and second gears, said third gear rotatably supported on a carrier which drives said input member of said interaxle differential;

a first clutch for selectively coupling said second gear to said mainshaft for driving said input member at a first speed ratio relative to said mainshaft, said first clutch is further operable for selectively coupling said second gear to said housing for driving said input member at a second speed ratio relative to said mainshaft; and a second clutch operable for selectively disconnecting one of said first and second output members from driven connection with its corresponding driveline.

23. The transmission of claim 22 wherein said first gear is a sun gear, said second gear is a ring gear, and said third gear is a pinion gear.

24. The transmission of claim 22 further comprising a reverse gear assembly including a reverse input gear driven by one of said constant mesh gear sets, a reverse output gear meshed with a transfer gear fixed to said second gear, and a third clutch for selectively coupling said reverse output gear to said reverse input gear.

25. The transmission of claim 22 further comprising a transfer shaft coupled to said first output member, and a drive mechanism coupling said transfer shaft to said front output shaft.

26. The transmission of claim 25 wherein said second clutch is operable to selectively connect and disconnect said transfer shaft to said drive mechanism.

27. The transmission of claim 22 wherein said second clutch includes a mode collar movable between a 4 WD position whereat said one of said first and second output members is coupled to its corresponding driveline for establishing a four-wheel drive mode, and a 2 WD position whereat said one of said first and second output members is uncoupled from its corresponding driveline for establishing a two-wheel drive mode.

28. The transmission of claim 27 wherein said second clutch further includes a synchronizer for causing speed synchronization between said one of said first and second output members and its corresponding driveline in response to movement of said mode collar to said 4 WD position.

* * * * *